United States Patent
Gundrum et al.

(10) Patent No.: US 6,830,683 B2
(45) Date of Patent: Dec. 14, 2004

(54) FILTER CARTRIDGE ASSEMBLY WITH BRINE SEAL AND RETAINING RING

(75) Inventors: Robert R. Gundrum, Sheboygan, WI (US); Jeffrey J. Julich, Sheboygan, WI (US)

(73) Assignee: Culligan International Company, Northbrook, IL (US)

(*) Notice: Subject to any disclaimer, the term of this patent is extended or adjusted under 35 U.S.C. 154(b) by 56 days.

(21) Appl. No.: 10/127,914

(22) Filed: Apr. 23, 2002

(65) Prior Publication Data

US 2003/0196947 A1 Oct. 23, 2003

(51) Int. Cl.$^7$ .............................................. B01D 27/00
(52) U.S. Cl. ............... 210/232; 210/321.83; 210/433.1; 210/440; 210/450; 210/453; 210/455
(58) Field of Search ........................ 210/321.6, 321.83, 210/321.87, 232, 433.1, 440, 450, 453, 455, 479, 443, 444, 445, 237, 234, 238; 220/293, 297, 298, 300, 319, 627, 737, 740; 55/498, 500, 502, 503, 504

(56) References Cited

U.S. PATENT DOCUMENTS

| | | |
|---|---|---|
| 4,645,601 A | 2/1987 | Regunathan et al. |
| 5,002,664 A | 3/1991 | Clack et al. |
| 5,082,557 A | 1/1992 | Grayson et al. |
| 5,114,572 A | 5/1992 | Hunter et al. |
| 5,266,195 A | 11/1993 | Hopkins |
| 5,389,260 A | 2/1995 | Hemp et al. |
| 5,595,651 A | 1/1997 | Pavel |
| 5,891,334 A * | 4/1999 | Gundrum et al. ............ 210/232 |
| 6,436,282 B1 * | 8/2002 | Gundrum et al. ............ 210/117 |

FOREIGN PATENT DOCUMENTS

| | | |
|---|---|---|
| EP | 0880987 | 12/1998 |
| WO | WO 0021640 | 4/2000 |
| WO | WO 0126777 | 4/2001 |
| WO | WO 03002228 | 1/2003 |
| WO | WO 03002229 | 1/2003 |

* cited by examiner

*Primary Examiner*—W. L. Walker
*Assistant Examiner*—Krishnan S Menon
(74) *Attorney, Agent, or Firm*—Greer, Burns & Crain, Ltd.

(57) ABSTRACT

A filter cartridge assembly intended for replaceable installation in a demountable cartridge housing includes in one embodiment, a retaining ring that is attached to the product water tube of the filter cartridge, is inserted with the cartridge into the housing, and is locked to the housing such that, upon subsequent removal of the housing to change the cartridge, the cartridge will be forced from sealing engagement with the end cap header and caused to remain in the housing until the housing has been removed. The integral retaining ring and cartridge are then simply unlocked and removed from the housing for replacement. Brine ring embodiments that are welded to the housing or attached to the housing with a snap-in connection are also disclosed.

23 Claims, 5 Drawing Sheets

FILTER CARTRIDGE ASSEMBLY WITH BRINE SEAL AND RETAINING RING

BACKGROUND OF THE INVENTION

The present invention pertains to replaceable cartridge type filters and, more particularly, to such a filter utilizing a semipermeable membrane cartridge with an assembly for retaining the cartridge in the housing when it is removed for replacement.

Replaceable cartridge filters have been used in water treatment systems for many years. A typical filter unit of this type utilizes an elongate, generally cylindrical housing or sump which is open at one end for the receipt of a replaceable filter cartridge. The cartridge and the housing are demountably attachable to an enclosing end cap. The end cap may be a unitary cover or part of a header or manifold system for control of fluid flow into and out of the cartridge. The filter cartridge may include any of several well known kinds of filter media, and multiple housings and associated filter cartridges may be attached to a common header system for the serial removal of a wide variety of both suspended and dissolved contaminants from a liquid stream. The media used in filter cartridges varies widely, depending upon the contaminant to be removed, and such media include granular particulate materials, coarse sintered blocks, paper and plastic filters, and semi-permeable membranes.

One common type of reverse osmosis (RO) filter cartridge utilizes a membrane which is spirally wrapped around a porous center tube and enclosed in an impervious cylindrical outer wrap. The opposite ends of the cartridge are open, with one of the ends receiving untreated incoming water under pressure and in which most dissolved solids are separated as the water passes through the semipermeable membrane and flows radially toward the porous center tube. The treated water (or membrane permeate) passes along the center tube to an outlet end. The untreated water containing the concentrated dissolved solids (known as the concentrate and commonly referred to as brine) passes out of the opposite end of the membrane cartridge. Such a cartridge typically includes a brine seal which is interposed between the outer cartridge wrap and the inside wall of the cartridge housing to prevent untreated water from bypassing the cartridge and mixing directly with the brine. However, in certain RO cartridge assemblies, such as an assembly in which the brine seal is located at one end of the element and the outlet for the brine flow is located at the opposite end of the element and housing, a volume of stagnant water is created between the outer diameter ("OD") of the element and the inner diameter ("ID") of the housing. This pool of stagnant water is not flushed by continuous flow through the element and therefore provides an area for the propagation of bacteria which, in turn, may lead to fouling by migration to active areas of the RO membrane surface. Depending on how a system is designed, the potential problem of pools of stagnant water, either on the untreated water side or the brine water side of the RO element, is a problem in many RO systems which utilize a brine seal.

The product water outlet in the typical RO filter cartridge comprises a cylindrical neck, which is typically an extension of the center product water tube, and is received in a cylindrical sleeve which forms part of the housing end cap and contains a product water discharge port. The interface between cartridge neck and the sleeve on the cap must be tightly sealed and one typical seal arrangement comprises a pair of axially spaced O-rings which are seated in annular grooves in the cartridge neck and which engage the inside wall of the sleeve in the cap. RO filter cartridges of the foregoing general type are shown, for example, in U.S. Pat. Nos. 4,645,601, 5,002,664, 5,082,557, 5,266,195 and 5,389,260.

A typical application for a reverse osmosis membrane filter cartridge of the foregoing general types is in purifying tap water for drinking. As indicated, such a filter cartridge is commonly utilized in a series arrangement with other replaceable cartridge filters which remove from the untreated water other suspended and dissolved solids which cannot be removed by membrane separation. Such water treatment units are commonly mounted beneath a sink on which the tap is located or in another confined and typically somewhat restricted space. A number of problems relating to the replacement of filter cartridges generally and RO filter cartridges particularly have arisen with the use of these systems.

In multi-cartridge systems which may include three units, manufacturers like to utilize identical filter housings for simplicity in manufacturing and inventory, as well as to maintain a uniform product appearance. However, certain filter cartridges and often RO membrane cartridges, do not fit well in housings designed for other types of filter cartridges used in these multi-cartridge systems. As a result, special adapters, special covers, or special non-standard housings may have to be used. A specialized and relatively complex housing end cap is shown, for example, in the above identified U.S. Pat. No. 5,082,557. A specialized, non-standard housing is shown in U.S. Pat. No. 5,266,195.

Because RO filter cartridges must handle and provide an interface for three liquid flows, namely, untreated water, treated water (membrane permeate), and brine (membrane concentrate), some means for accommodating the additional liquid flow, not present in other kinds of filter cartridges, must be utilized. In U.S. Pat. No. 5,002,664, the brine flow is accommodated by a special connection through the bottom of the RO cartridge housing. This complicates the construction of the unit, as well as the ease of filter replacement.

Another problem unique to filter cartridges having a neck on one end for the treated water outlet, which includes an O-ring seat arrangement engaging the cylindrical ID of a sleeve in the end cap, is that the resulting tight seal causes the filter cartridge to hang up in the end cap when the housing is unscrewed from the end cap for removal and replacement of the filter cartridge. The filter housing must be slid downwardly along the entire length of the file cartridge before the cartridge can be independently removed from its sealed attachment to the end cap or header. When operating in a confined space, such as under a kitchen sink, this lack of head space may present a serious obstacle to ease of replacement. This problem is addressed and solved in U.S. Pat. No. 4,645,601 by providing an integral cartridge and housing which are removed together. Such an arrangement, though convenient, is extremely uneconomical because the housing must be replaced each time the filter cartridge is replaced.

One solution to the problem is shown in U.S. Pat. No. 5,891,334 where a cartridge retaining ring is used to hold the filter cartridge in place within the housing and to retain it in place when the housing is unscrewed or otherwise removed from the end cap or header for cartridge replacement. After insertion of the filter element into the housing, the cartridge retaining ring is placed over the upper end of the filter element and engages with a brine ring attached to the housing. The retaining ring bears against the upper end of the element as the housing is removed and forces the neck of the element to disengage from the end cap.

Although the use of the foregoing retaining ring arrangement has worked well, it still presents a number of drawbacks. First of all, the retaining ring, as a separate piece, requires separate additional assembly and disassembly steps and is subject to being misplaced and lost. Because the retaining ring is operatively attached to the housing, but not to the filter element, removal of the housing causes the retaining ring to bear on the end of the element which may cause damage to a fragile reverse osmosis membrane. Finally, in filter units where the brine ring must be welded to the interior wall of the housing, the need to provide a sonic weld relatively deep inside the housing has created problems of weld equipment accessibility and weld quality.

SUMMARY OF THE INVENTION

In accordance with one embodiment of the present invention, a filter cartridge retaining ring is secured directly to the neck of the product water tube that supports the membrane of an RO filter cartridge. The combined ring and cartridge are inserted together into an open-ended filter housing, and the housing is threadably attached to an enclosing end cap. Interengaging coupling parts on the retaining ring and the housing cooperate when the filter element is inserted into the housing to lock the cartridge therein. The end cap includes an integral center sleeve that surrounds the neck of the cartridge, when the housing is attached to the end cap, and provides therewith a liquid-tight seal. When the housing is subsequently removed from the end cap, as to change the filter cartridge, the filter cartridge neck is pulled from the end cap center sleeve because of the rigid interconnection between the cartridge and the housing provided by the retaining ring. This allows the housing and cartridge to be removed together.

In the preferred embodiment, a brine ring is attached to the inner wall of the housing adjacent the open end, and the coupling parts include interengaging connectors on the retaining ring and the brine ring. Preferably, the brine ring comprises a cylindrical tubular sleeve and the connectors comprise a pair of diametrically opposite slots in the upper end of the tubular sleeve and a pair of lugs on the retaining ring adapted to be received in the slots.

The reverse osmosis filter cartridge used in the filter assembly of this invention includes a cylindrical body that is covered with an impervious outer layer. A liquid-tight outer wrap seals the interface between the retaining ring and the outer layer of the cartridge body to provide an inner brine seal component. A first annular seal carried on an outer surface of the retaining ring engages an inner surface of the brine ring, upon insertion of the filter cartridge into the housing, to provide an intermediate brine seal component. A second annular seal is carried on an outer surface of the brine ring and engages an inner surface of the end cap, upon attachment of the housing to the end cap, to provide an outer brine seal component. In a preferred operational orientation, an untreated water inlet is located in the neck end of the RO cartridge, and the flow passage defined by the neck comprises a treated water outlet. The other end of the cartridge includes a brine water outlet. The three brine seal components form a composite brine seal that provides liquid separation between the brine water outlet and the untreated water inlet.

In an alternate embodiment of the brine ring, the ring may be made for a snap-in attachment to the cartridge housing, rather than welded or bonded to the inner wall of the housing. This modified brine ring is, however, intended to be left in place when the filter cartridge and retaining ring are removed for cartridge replacement.

DETAILED DESCRIPTION OF THE PREFERRED EMBODIMENT

Figure 1:
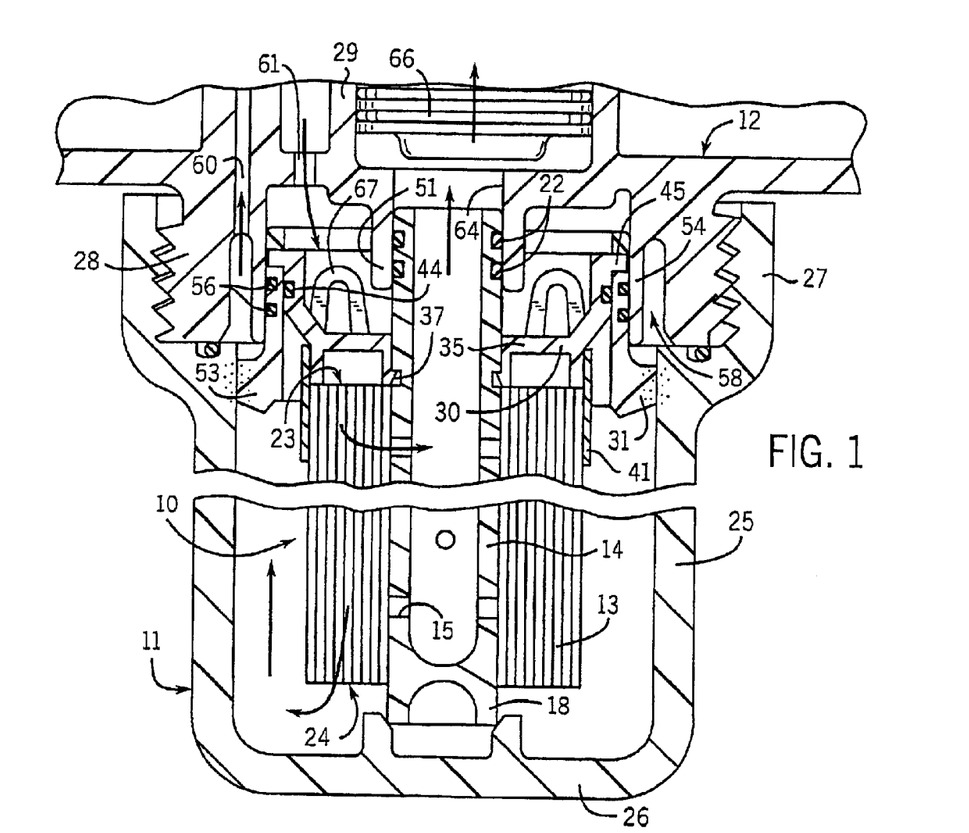
FIG. 1 is a vertical section through a filter assembly showing the integral retaining ring and cartridge assembly of one embodiment of the present invention in its operative installed position.

Referring to FIG. 1, a replaceable filter cartridge 10 is contained inside a tubular housing 11 which is removably attached to an upper end cap 12. The filter cartridge 10 utilizes a semi-permeable reverse osmosis membrane to remove dissolved solids from untreated water by reverse osmosis. The construction of the filter cartridge 10 is generally conventional and is of a type presently available from several manufacturers. The cartridge includes an interior spirally wound membrane 13 which may include an intermediate separator layer, shown schematically in FIGS. 1 and 5. The membrane 13 is wound around a central hollow product water tube 14, which extends the length of the cartridge 10, and is provided in its outer surface with a pattern of through holes 15. The membrane is closed by an impervious outer cover 16 which may be plastic or any other suitable material. The lower end of the cartridge has a short central extension 18, and the opposite upper end has a small diameter cylindrical neck 20 both of which preferably comprise integral extensions of the interior product water tube 14. The neck 20 is provided with a pair of axially spaced annular grooves 21 in which are received sealing O-rings 22. The opposite axial ends of the cartridge 10, adjacent, respectively, the cylindrical neck 20 and the lower extension 18, are open to expose the membrane 13 to an incoming flow of untreated water and an outgoing flow of brine. The brine flow comprises the high volume concentrate of water and dissolved solids which does not pass through the semi-permeable membrane. Although membrane filter cartridges of the type used in this invention may accommodate untreated water and brine water flows through either end, the cartridge in the present embodiment is oriented with the untreated water inlet 23 on the upper end and the brine water outlet 24 on the lower end.

The filter housing 11 is of conventional molded plastic construction, which includes an elongated cylindrical side wall 25 and a closed bottom end 26. The open, upper end of the housing has an enlarged diameter end portion 27 with a threaded ID adapted to engage a correspondingly threaded OD on a cylindrical boss 28, which depends downwardly from the underside of the end cap 12. In this embodiment, the end cap comprises the lower portion of a multi-unit manifold header 29 which, as indicated previously, may accommodate several different types of filter units, each of which is contained in a housing similar to housing 11, threadably attached to a similar cylindrical boss 28. The remainder of the header (not shown) includes a pattern of passageways and valves to accommodate the flow of water through the system. Details of such a multi-unit system are shown in co-pending and commonly owned application Ser. No. 09/633,995 entitled "Flow Control Module for RO Water Treatment System" filed Aug. 8, 2000, and which is incorporated by reference herein.

Figures 4, 5:
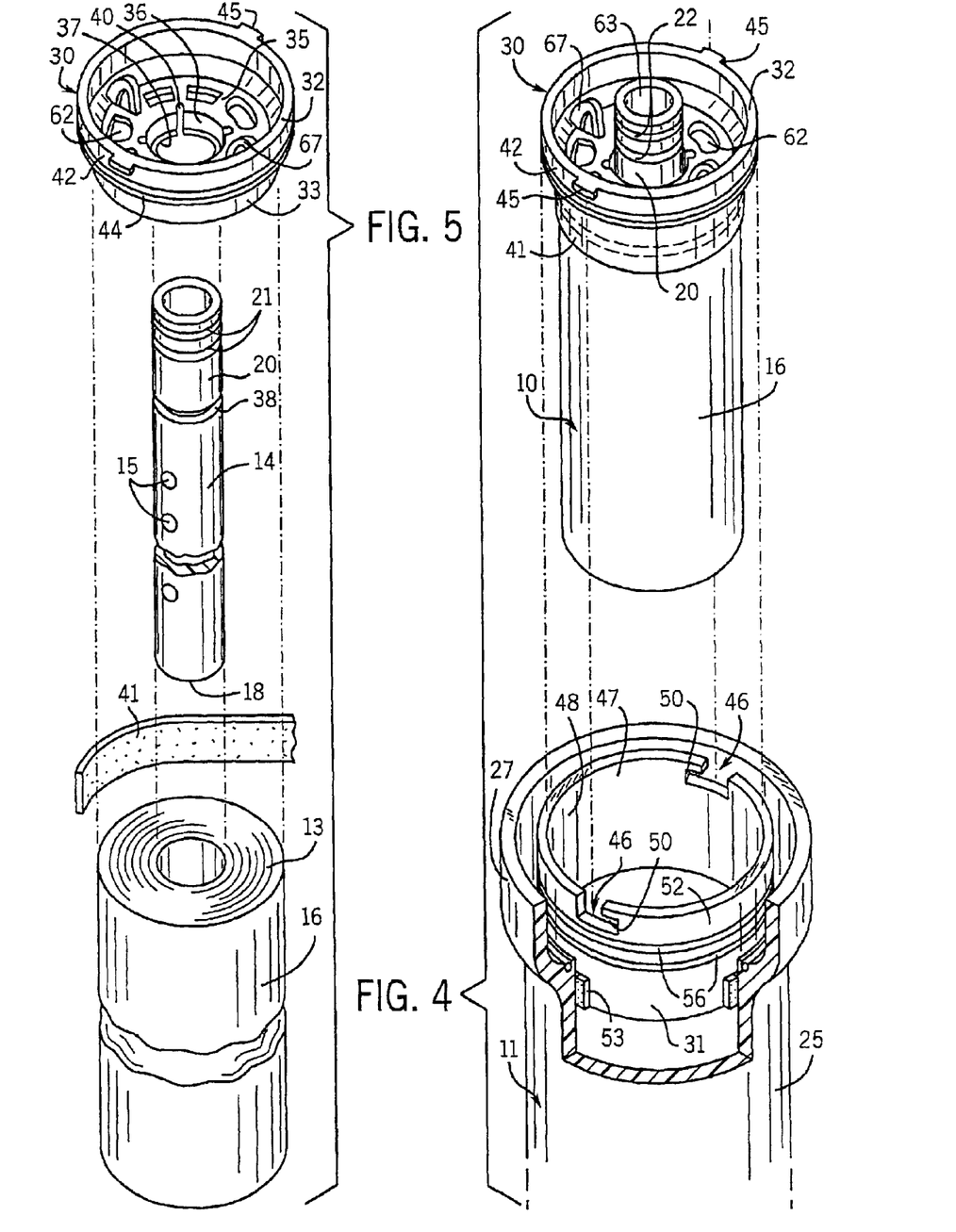
FIG. 4 is an exploded perspective view of the filter cartridge with integral retaining ring prior to insertion into and locking within the housing.
FIG. 5 is an exploded perspective view of an RO filter cartridge of the preferred embodiment of the present invention.

In accordance with the present invention and referring particularly to FIGS. 4 and 5, the filter cartridge 10 and the filter assembly in which it is used are modified to provide a retaining ring 30 that is fixed to the filter cartridge and a composite brine seal that eliminates the skirted brine seal attached to the outside of the filter cartridge. The retaining ring 30 cooperates with a brine ring 31 in the housing 11 such that insertion of the combined cartridge and retaining ring into the housing allows the combination to be locked in place.

After the basic reverse osmosis filter element, comprising a semipermeable membrane 13 wound on a central product tube 14 and enclosed by an outer cover 16, is prepared, the retaining ring 30 is placed over the exposed neck 20 of the product water tube 14, slid downwardly along the neck, and locked in place. The retaining ring 30 includes an upper large diameter ring portion 32 joined integrally to a smaller diameter lower ring portion 33 by an intermediate frustoconical surface 34. The interior of the retaining ring is provided with a central web 35 provided with a center opening 36 sized to receive the product tube neck 20. The lower edge of the center opening 36 is provided with an annular rib 37 that snaps into an annular groove 38 in the neck 20 of the product water tube located just above the filter membrane 13. The center opening 36 in the retaining ring center web 35 is provided with a number of spaced notches 40 that interrupt the annular rib 37, thereby allowing the wall of the opening 36 to flex slightly to allow the ring to be slid downwardly over the product water tube neck 20, until the rib snaps into the annular groove 38. To prevent rotation of the retaining ring 30 relative to the product water tube 14, the rib 37 may be secured in the groove by solvent bonding, sonic welding, or other means. One alternate means of preventing rotation would be to provide barrier ribs in the annular groove 38 corresponding in position to the notches 40 in the center opening of the ring. The interrupted ends of the annular rib 37 would engage such barrier ribs and inhibit relative rotation between the ring and the tube.

The outside surface of the lower retaining ring portion 33 is sealed to the upper end of the outer cover 16 of the filter cartridge, with a tape-like sealing wrap 41. The sealing wrap comprises one part of a multi-component brine seal, the other components of which will be described hereinafter.

The upper portion 32 of the retaining ring 30 has a cylindrical outer surface 42 in which is formed a circumferential annular groove 43 in which is seated an O-ring 44. On diametrically opposite sides of the cylindrical outer surface 42, are outwardly extending lugs 45. The lugs 45 are adapted to be received in slots 46 formed in the upper end of the tubular body 47 of the brine ring 31. The brine ring body 47 has a cylindrical inner surface 48 that is engaged by the O-ring seal 44 as the retaining ring on the cartridge 10 slides into the tubular body 47 of the brine ring 31. Once the lugs 45 are received in the slots 46, the filter cartridge 10 is rotated slightly on its axis (in a counterclockwise direction with respect to the housing 11 in FIG. 4), causing the lugs 45 to enter undercut portions 50 in the slots 46. The filter cartridge is then locked against axial withdrawal from the housing. The O-ring 44 provides a second or intermediate component of the multi-component brine seal.

The threaded cylindrical boss 28, depending downwardly from the underside of the manifold 29, includes a smaller diameter central sleeve 51 which receives the upper end of the cylindrical neck 20 of the filter cartridge when the housing containing the cartridge is threaded onto the boss 28. The tight seal between the cartridge neck 20 and the sleeve 51 provided by the double O-ring seal 22 causes the filter cartridge to hang up and resist axial withdrawal from the sleeve 51 when the housing is removed, as for filter cartridge replacement. However, with the lugs 45 on the retaining ring locked in the undercut portions 50 of the brine ring slots 46, the filter cartridge will be removed axially along with the housing. By locking the retaining ring 30 to the product water tube 14 (by entry of the annular rib 37 into the annular groove 38 in the neck portion 20 of the product water tube) the axial force resisting movement of the upper end of the neck 20 from the central sleeve 51 is borne by the neck and the retaining ring. In prior art constructions, where the retaining ring is not connected directly to the product water tube, the axial force is borne by the upper end of the wound filter membrane 13 which bears against the underside of the retaining ring. This could cause damage to the relatively fragile membrane or, if there is relative axial movement between the ring and the membrane, the portion of brine seal provided by the sealing wrap 41 might be disturbed.

The tubular body 47 of the brine ring 31 has an outer cylindrical surface 52 and is provided at its lower end with a number of circumferentially spaced, radially extending connecting tabs 53. The connecting tabs serve to space the brine ring radially inwardly from the inner surface of the housing side wall 25 and to provide surfaces for attaching the brine ring to the inside of the housing. Preferably, there are four connecting tabs 53 which are joined to the upper end of the housing side wall just below the threaded upper end portion 27. The connecting tabs 53 may be secured to the wall by sonic welding, solvent bonding or any other convenient means. The upper end of the brine ring body 47 extends upwardly from the connection points and into the upper end portion 27 of the housing. When the housing is threaded onto the end cap boss 28, the brine ring 31 extends into the interior of an annular cylindrical wall portion 54 in the boss 28. The cylindrical wall portion 54 has a cylindrical inner surface 55 which is engaged by a pair of O-rings 56 carried in annular grooves 57 formed in the outer cylindrical surface 52 of the brine ring. These O-rings 56 provides a liquid tight seal that forms the third component of the multi-component brine seal.

An annular slot 58 is formed in the boss 28 between the outer threaded surface and the annular cylindrical wall 54. A brine outlet port 60 is formed in the bottom of the annular slot 58 and extends upwardly through the body of the manifold 29 to a suitable drain connection. Similarly, an untreated water inlet port 61 is formed in the body of the header and opens into the space within the boss 28 between the annular cylindrical wall 54 and the sleeve 51. The center web 35 of the retaining ring 30 is provided with a number of flow openings 62 so that untreated water entering the interior space is directed into the untreated water inlet end 23 of the filter cartridge 10. As a result of membrane separation, the larger volume brine flow leaves the filter cartridge 10 through the bottom brine water outlet 24, while the treated water (also referred to as membrane permeate or product water) moves radially inwardly through the holes 15 in the product water tube 14 and then upwardly through a product water outlet 63 defined by the neck 20 of the product water tube 14. The downwardly depending sleeve 51 defines a product water port 64 in the header 29.

Figure 2:
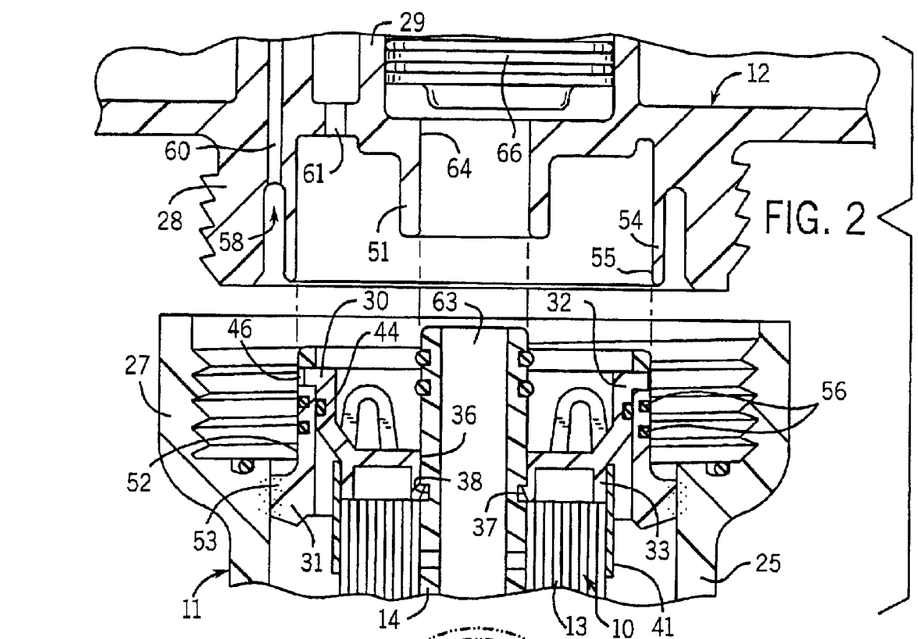
FIG. 2 is a vertical section through the filter assembly of FIG. 1 showing the separation of the interconnected housing and filter cartridge from the end cap.
Figure 3:
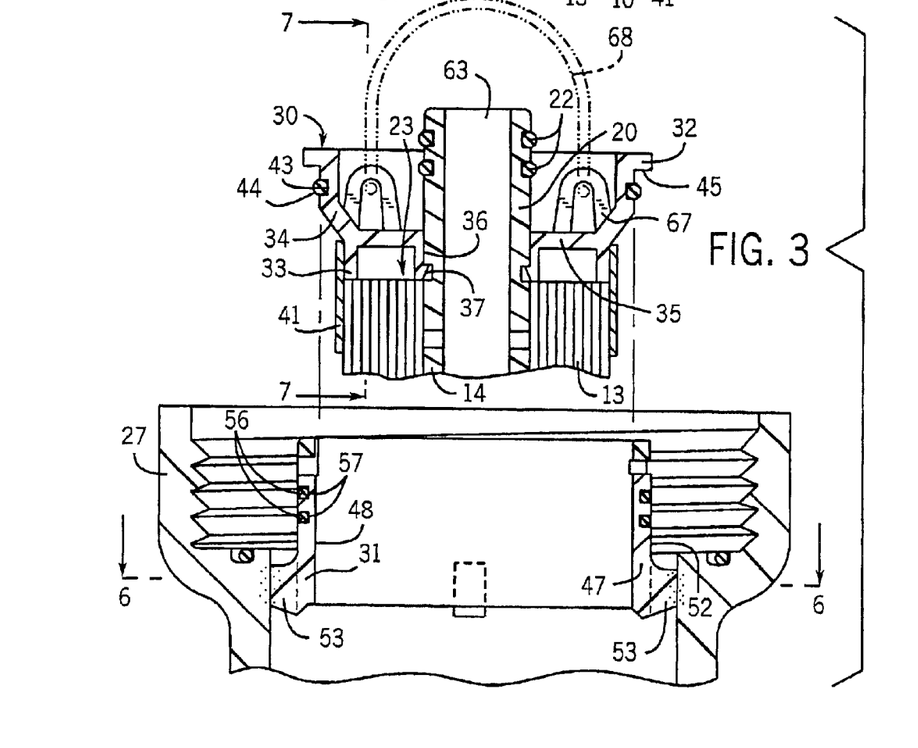
FIG. 3 is a vertical section similar to FIGS. 1 and 2 showing separation of the integral retaining ring and filter cartridge from the housing after unlocking the interengaging connectors.
Figure 6:
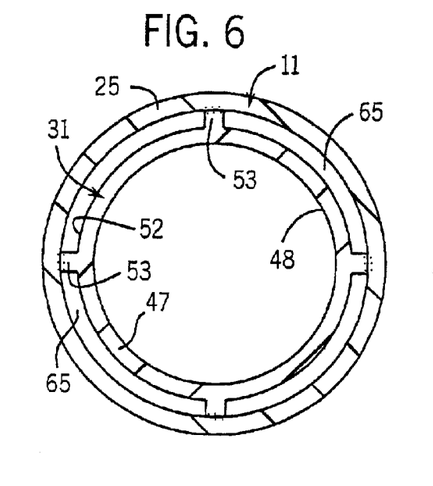
FIG. 6 is a horizontal section taken on line 6—6 of FIG. 3.

Referring particularly to FIGS. 1–3, the three part brine seal is comprised of the inner sealing wrap 41, the O-ring 44 and the pair of O-rings 56. These combine to provide fluid separation between the incoming untreated water entering the system via inlet port 61 and the brine flow exiting the system via outlet port 60. Brine flow from the outlet end 24 of the filter cartridge passes upwardly through the open space between the outside of the cartridge and the inside wall of the housing, through the spaces 65 defined by the brine ring connecting tabs 53 (see FIG. 6), into the annular slot 58 and through the brine outlet port 60. Treated water leaving the system via the product water port 64 may be directed into a flow control module 66 mounted in the manifold header 29. The module may be of the type described in the above identified co-pending application.

Figure 7:
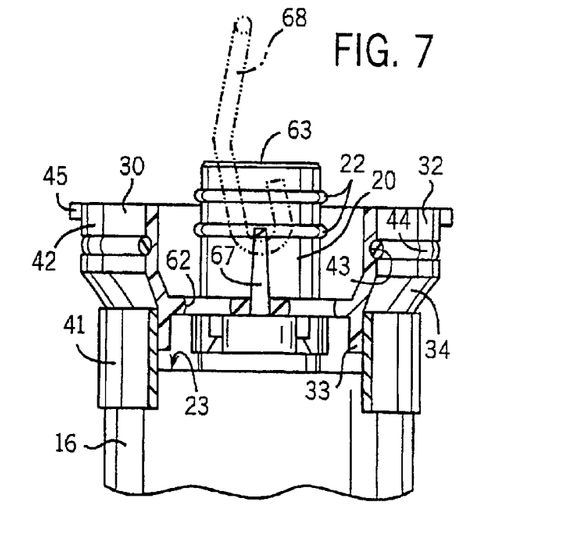
FIG. 7 is a partial sectional view taken on line 7—7 of FIG. 3.

Finger tabs 67 extending upwardly from the center web 35 of the retaining ring 30 facilitate manual insertion of the cartridge 10 into the housing and rotation of the cartridge to cause the locking lugs 45 to move into the undercut portions 50 in the slots 46 in the brine ring 31. It should be noted that, if any relative rotation of the filter cartridge with respect to the housing occurs during the process of threading the upper end portion 27 of the housing onto the boss 28, such that the lugs 45 may tend to back out of the undercut portions 50, reverse rotation will occur when the housing is unthreaded and the lugs will move back into the undercut portions. Thus, the filter cartridge will remain locked in the housing as it is removed from the header such that the entire assembly can be removed together. Referring to FIGS. 3 and 7, the finger tabs 67 are preferably provided with openings for receipt of the hooked ends of a handle 68 to facilitate removal of the cartridge from the housing for replacement. The handle 68 is preferably sized such that it may nest within the upper ring portion 32 of the retaining ring 30 while the cartridge is installed and operating. The handle may optionally be constructed as a pull ring formed as an integral part of the retaining ring 30.

Figure 8:
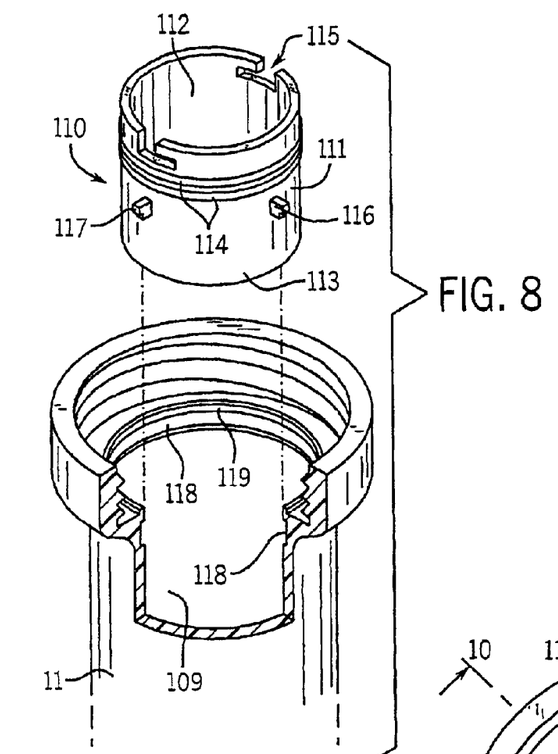
FIG. 8 is an exploded isometric view of another embodiment of the invention in the form of a brine ring attachable with a snap-in connection to the interior of a housing.
Figure 9:
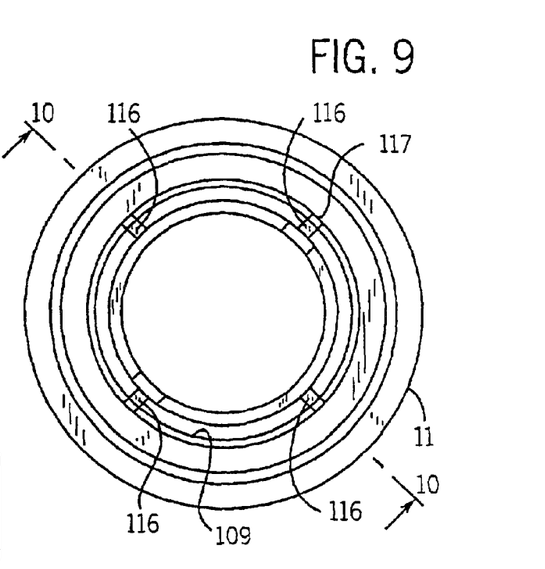
FIG. 9 is a top plan view of the FIG. 8 housing with the brine ring in place.
Figure 10:
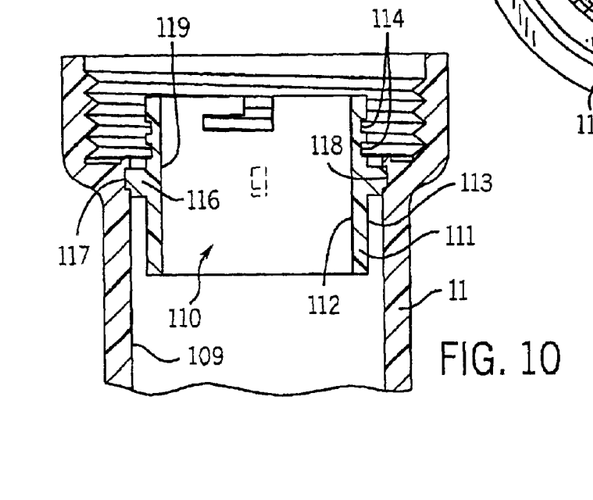
FIG. 10 is a sectional detail taken on line 10—10 of FIG. 9.

An alternate embodiment of a brine ring in accordance with the present invention is shown in FIGS. 8–10. The brine ring 110 is similar in construction to the brine ring 31 of the previously described embodiment, except that it is attached to the inner wall of the housing with a snap-in connection. Thus, the brine ring 110 includes a tubular body 111 defined by inner and outer generally cylindrical walls 112 and 113, respectively. The outer cylindrical wall 113 near the upper end of the tubular body is provided with a pair of annular O-ring grooves 114 for receipt of the O-rings that seal against the cylindrical inner surface of the end cap boss as described with respect to the previous embodiment. Also in a manner similar to the FIG. 5 assembly, the upper edge of the tubular body 111 is provided with attachment slots 115 for receipt of attachment lugs on a retaining ring (not shown).

A number of integral connector tabs 116 extend outwardly from the brine ring outer wall 113 and are positioned equally spaced around the circumference of the brine ring body 111. The connector tabs terminate in generally flat outer end faces 117. The brine ring 110 is adapted to be inserted and connected to the same housing 11 used with the previously described embodiment. The inner cylindrical wall 109 of the housing 11 is provided with a shallow annular groove 118 which can be conveniently milled or otherwise cut into the cylindrical surface 109. The groove 118 is positioned just below the upper edge of the cylindrical wall 109 such that it is separated from the upper edge by a narrow inner wall band 119. The shallow annular groove 118 need only be cut to a depth in the range of about 0.020 to 0.040 inch (0.5 to 1.0 mm). The outer end faces 117 of the connector tabs 116 define a cylindrical surface that is slightly greater than the diameter of the cylindrical inner wall 109 of the housing immediately adjacent the groove, and just slightly less than the diameter of the shallow annular groove 118. Furthermore, the tubular body 111 of the brine ring is thin enough that it will deflect slightly and enough to permit the outer ends of the connector tabs to be moved past the inner wall band 119 and snap into the shallow annular groove 118. Though not welded or otherwise bonded to the inside wall surface 109 of the housing, the snap-in attachment of the brine ring 110 is intended to be permanent.

In use, the brine ring 110 is first installed in the housing by flexing the tubular body 111 slightly and causing the connector tabs to enter the annular groove 118. The filter cartridge (10 in FIG. 4 with the attached retaining ring 30) is then inserted axially through the cylindrical interior of the brine ring and into the housing until the O-ring seal (44 in FIG. 5) on the cartridge engages the inner cylindrical wall 112 of the ring 110 (and the lower end of the cartridge bottoms in the housing). The entire assembly is then attached to the threaded end cap (12 of FIG. 2), all in a manner previously described.

The inherent flexibility of the tubular brine ring 110 provides sufficient deflection for insertion and snap-in attachment of the ring into the housing 11. Although the brine ring may be removed, if necessary, it is intended to be left in place once installed in the housing. When the filter cartridge 10 is replaced, the entire housing assembly is removed from threaded connection to the end cap 12, the retaining ring 30 removed from locking engagement with the upper end of the brine ring, and the filter cartridge and retaining ring pulled axially out of the housing and through the brine ring.

Figure 11:
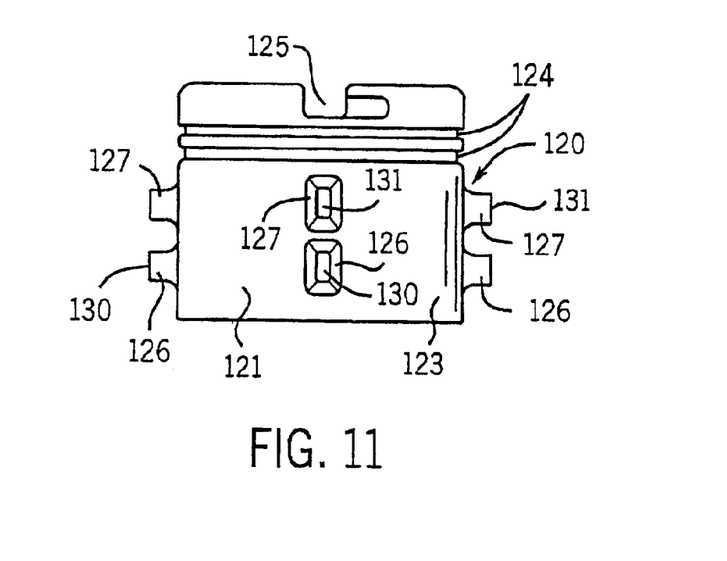
FIG. 11 is a side elevation view of a modified snap-in brine ring similar to the type shown in FIG. 8.
Figure 12:
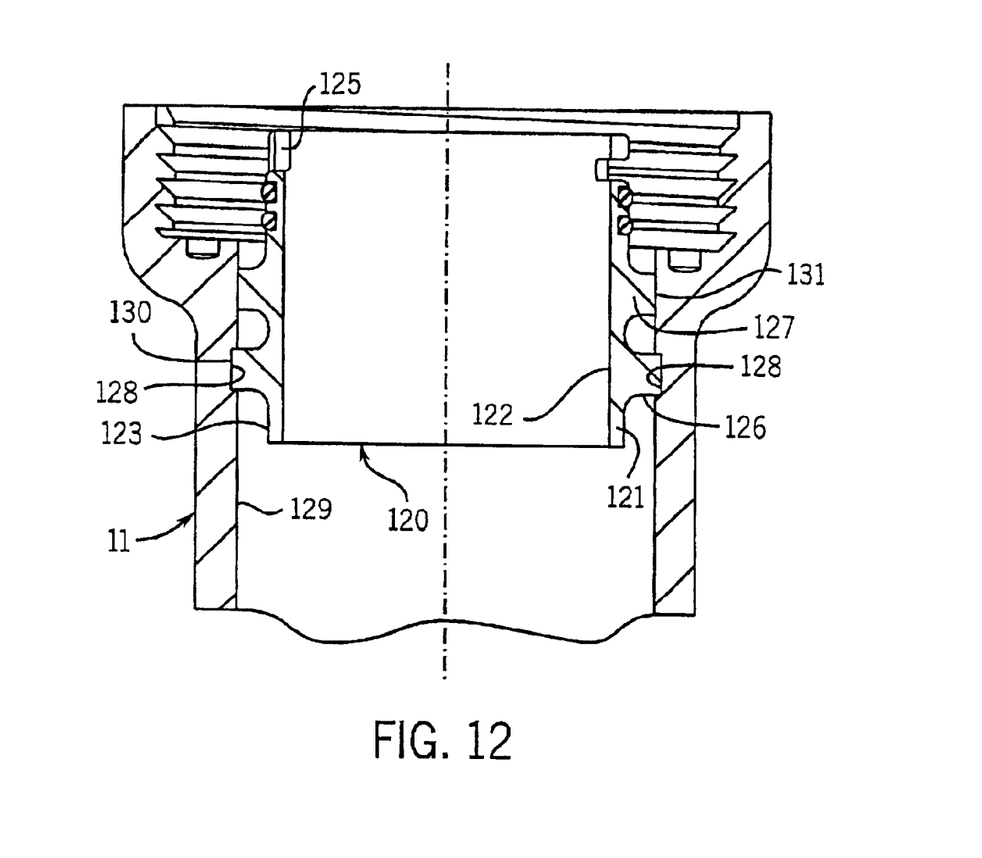
FIG. 12 is an enlarged vertical section through the upper portion of a filter housing showing the snap-in mounting of the brine ring shown in FIG. 11.

Referring to FIGS. 11 and 12, a modified brine ring 120 is similar in construction to the snap-in brine ring 110 shown in FIGS. 8–10. Thus, modified brine ring 120 includes a tubular body 121 defined by inner and outer generally cylindrical walls 122 and 123, respectively. The outer cylindrical wall 123, near the upper end of the tubular body, is provided with a pair of annular O-ring grooves 124, as described and for the same purpose as the previously described FIG. 8 embodiment. As also previously described with respect to the other embodiments, the upper edge of the tubular body 121 is provided with attachment slots 125 for receipt of attachment lugs 45 on a retaining ring (see FIGS. 4 and 5). In this embodiment, a number of integral connector tabs 126 extend outwardly from the brine ring outer wall 123, equally spaced around the circumference of the brine ring body 121. In this embodiment, the connector tabs 126 are positioned at a location lower than the corresponding connector tabs 116 of the embodiment of FIGS. 8 and 10. A number of stabilizing tabs 127 extend integrally from the outer cylindrical wall 123 of the tubular body in an arrangement aligned with and spaced vertically above the connector tabs 126.

Referring particularly to FIG. 12, the brine ring 120 is adapted to be mounted inside the same housing 11 used with the previously described embodiments. The cylindrical inner wall 129 of the housing 11 is provided with a shallow annular groove 128 which may be identical dimensionally to the annular groove 118 of FIG. 8, but which is cut into the housing wall 129 at a position axially lower than in the previously described embodiment. The outer end faces 130 of the connector tabs 126 define a cylindrical surface that is slightly greater than the diameter of the cylindrical inner wall 129 of the housing immediately adjacent the groove, but just slightly less than the diameter of the annular groove 128 itself. On the other hand, the outer end faces 131 of the stabilizing tabs 127 define a cylindrical surface that is equal to or just very slightly smaller than the diameter of the cylindrical inner wall 129 of the housing above the annular groove 128. With this construction, the brine ring 120 is inserted into the housing until the connector tabs 126 snap into the annular groove 128. The following stabilizing tabs 127 engage the inner wall of the housing with a light press or close tolerance slip fit, such that the outer faces 131 of the tabs 127 provide a stabilizing abutment against the housing wall. This helps assure that the brine ring 120 does not deflect in use in a direction transverse to its axis.

We claim:

1. A filter assembly comprising:
   a filter cartridge having a neck on one end defining a liquid flow passage, the filter cartridge insertable into and contained in use in an open-ended housing, said housing including an inner wall,
   an enclosing end cap to which said housing is demountably and sealably attached, said end cap including an integral sleeve which surrounds the neck of the cartridge in the attached position and provides therewith a liquid-tight seal;
   a brine ring attached to said inner wall of the housing adjacent the open end thereof, said brine ring including an inner cylindrical surface;
   a retaining ring secured to and surrounding the neck of the filter cartridge and in direct contact with and secured to the neck prior to insertion of the cartridge into the housing, said retaining ring including an outer cylindrical surface slidingly received within the inner cylindrical surface of the brine ring upon insertion of the cartridge into the housing, said retaining ring outer surface carrying a seal that engages and provides a liquid-tight intermediate brine seal in the interface with the inner cylindrical surface of the brine ring; and,
   a coupling part on each of the retaining ring and the brine ring cooperating to lock the cartridge within the housing;
   whereby, when the housing is demounted from the end cap, the filter cartridge neck is pulled from the integral sleeve, and the housing and cartridge are removable together.

2. The filter assembly as set forth in claim 1 wherein:
   said coupling parts including interengaging connectors on said retaining ring and said brine ring.

3. The filter assembly as set forth in claim 1 wherein said brine ring comprises a cylindrical tubular sleeve and said interengaging connectors comprise a pair of diametrically opposite slots in the upper end of said tubular sleeve and a pair of lugs on the retaining ring adapted to be received in said slots.

4. The assembly as set forth in claim 1 wherein said filter cartridge comprises a replaceable reverse osmosis cartridge including a cylindrical body covered with an impervious outer layer;
   a liquid-tight outer wrap sealing the interface between the retaining ring and said outer layer to provide an inner brine seal component;
   a first annular seal carried on an outer surface of the retaining ring and slidingly engaging an inner surface of the brine ring upon insertion of the filter cartridge into the housing to provide an intermediate brine seal component; and,
   a second annular seal carried on an outer surface of the brine ring and engaging an inner surface of the end cap upon attachment of the housing to the end cap to provide an outer brine seal component.

5. The assembly as set forth in claim 4 including an untreated water inlet located in the neck end of the cartridge, and wherein the flow passage defined by the neck comprises a treated water outlet.

6. The assembly as set forth in claim 5 wherein the other end of the cartridge includes a brine water outlet, and said brine seal components provide liquid separation between said brine water outlet and said untreated water inlet.

7. The assembly as set forth in claim 1 wherein said end cap includes a downwardly depending externally threaded cylindrical boss, the open end of said housing includes a threaded end providing a demountable attachment to the threaded cylindrical boss, said boss having a cylindrical interior surface and said brine ring having an outer cylindrical surface positioned within the open end of the housing and received within the cylindrical interior surface of the boss upon attachment, the outer cylindrical surface of the brine ring carrying a seal that engages and provides a liquid-tight outer brine seal in the interface with the interior surface of the cylindrical boss.

8. The assembly as set forth in claim 1 wherein the filter cartridge comprises a reverse osmosis cartridge having a cylindrical body with an impervious outer surface and defining an untreated water inlet and a brine water outlet on respective opposite ends; and,
   a liquid-tight annular wrap sealing the interface between the retaining ring and the outer surface of the filter cartridge body to provide an inner brine seal.

9. The assembly as set forth in claim 1 wherein said brine ring is demountably attached to the housing inner wall with a snap-in connection.

10. The assembly as set forth in claim 9 wherein said brine ring connection comprises a shallow annular groove formed in the inner wall of the housing; and,
    a plurality of circumferentially spaced connector tabs extending radially from the outer wall of the brine ring, said connector tabs having outer ends dimensioned to be received in said groove to secure the brine ring against axial movement with respect to the housing.

11. The assembly as set forth in claim 9 wherein said brine ring further includes a plurality of circumferentially spaced stabilizing tabs extending radially from the outer wall of the brine ring above said connector tabs, said stabilizing tabs having outer end faces dimensioned to engage the inner wall of the housing.

12. A filter assembly including a replaceable reverse osmosis filter cartridge of the type axially insertable into an open-ended housing having a generally cylindrical inner wall, said cartridge having a generally cylindrical body, a cylindrical neck on one axial end defining a liquid flow opening, the housing including a threaded interior on the open end for demountably and sealingly attaching the housing to a threaded exterior portion of an enclosing end cap, the end cap including an integral center sleeve which surrounds the neck of the cartridge in the attached position and provides therewith a liquid-tight seal, said assembly comprising:

a brine ring attached to the inner wall of the housing adjacent the open end thereof, said brine ring having an outer wall defining with the housing inner wall a flow passage and a cylindrical inner wall;

a retaining ring in direct contact with and attached to the cartridge neck and carrying a first annular seal adapted to sealingly engage the cylindrical inner wall of the brine ring when the cartridge is inserted into the housing; and, interengaging connector means on the brine ring and the retaining ring for holding the filter cartridge in the housing against axial withdrawal therefrom.

13. The assembly as set forth in claim 12 wherein said end cap includes a downwardly depending cylindrical boss carrying said threaded exterior portion and having a cylindrical interior surface;

said brine ring outer wall carrying a second annular seal adapted to engage the cylindrical interior surface of the end cap boss upon attachment of the housing to the end cap.

14. The assembly as set forth in claim 13 wherein the retaining ring is sealed to the end of the cartridge body with an annular sealing wrap.

15. The assembly as set forth in claim 14 wherein said cartridge includes an annular untreated water inlet in the end adjacent the neck, a brine outlet in the opposite end in communication with said brine flow passage, and a product water outlet in communication with the flow opening in the neck.

16. The assembly as set forth in claim 15 wherein said first and second annular seals and said annular sealing wrap comprise a composite brine seal that provides a liquid tight separation between said untreated inlet and said brine outlet.

17. The assembly as set forth in claim 16 wherein said end cap includes an untreated water port in communication with said treated water inlet, a brine port in communication with said flow passage, and a product water port in communication with said product water outlet.

18. A filter assembly including a replaceable reverse osmosis filter cartridge of the type axially insertable into an open-ended housing having a generally cylindrical inner wall, said cartridge having a generally cylindrical body having an impervious outer surface extending between an untreated water inlet at one end and a brine outlet at the other end, a cylindrical neck on one axial end of the body defining a permeate outlet, the housing including a threaded interior on the open end for demountably and sealingly attaching the housing to a threaded exterior portion of an enclosing end cap, the end cap including an integral center sleeve which surrounds the neck of the cartridge in the attached position and provides therewith a liquid-tight seal, said assembly comprising:

a brine ring attached to the inner wall of the housing adjacent the open end thereof, said brine ring having an outer wall spaced from and defining with the housing inner wall a flow passage and a cylindrical inner wall surrounding the cartridge body;

a retaining ring surrounding the cartridge neck and in direct contact with and secured to the neck prior to insertion of the cartridge into the housing, said retaining ring including a generally cylindrical outer surface and adapted to be received within the cylindrical inner wall of the brine ring after the cartridge is inserted into the housing;

interengaging connector means on the brine ring and the retaining ring for holding the filter cartridge in the housing against axial withdrawal therefrom; and brine seal means between the inner wall of the brine ring and the outer surface of the retaining ring for preventing liquid flow between the brine outlet and the untreated water inlet.

19. The assembly as set forth in claim 18 wherein said brine ring is attached to the housing inner wall with a snap-in connection comprising:

a shallow annular groove formed in the inner wall of the housing; and, a plurality of circumferentially spaced connector tabs extending radially from the outer wall of the brine ring, said connect tabs having outer ends dimensioned to be received in said groove.

20. The assembly as set forth in claim 19 wherein said brine ring further includes a plurality of circumferentially spaced stabilizing tabs extending radially from the outer wall of the brine ring above said connector tabs, said stabilizing tabs having outer end faces dimensioned to engage the inner wall of the housing with a light press or close tolerance slip fit.

21. The assembly as set forth in claim 19 wherein;

the annular groove is spaced from the upper edge of the housing inner wall by an inner wall band; and, the cylindrical inner and outer wall of the brine ring define a thin-walled tubular body of sufficient flexibility to permit the outer ends of said connector tabs to be moved past said inner wall band and into said annular groove.

22. The assembly as set forth in claim 19 wherein said connector tabs comprise four equally spaced tabs.

23. The assembly as set forth in claim 18 wherein the ends of said connector tabs define a cylindrical surface having a diameter greater than the diameter of the housing inner wall band and less than the diameter of the annular groove.

* * * * *